United States Patent
Wright Lakin (10) Patent No.: US 10,269,008 B2
(45) Date of Patent: Apr. 23, 2019

(54) METHODS AND SYSTEMS FOR PROVIDING PAYMENT CARDS

(71) Applicant: MASTERCARD INTERNATIONAL INCORPORATED, Purchase, NY (US)

(72) Inventor: Simon Wright Lakin, Lincolnshire (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 725 days.

(21) Appl. No.: 14/730,511

(22) Filed: Jun. 4, 2015

(65) Prior Publication Data
US 2015/0356550 A1 Dec. 10, 2015

(30) Foreign Application Priority Data
Jun. 5, 2014 (GB) .................... 1409975.8

(51) Int. Cl.
G06Q 40/00 (2012.01)
G06Q 20/34 (2012.01)
G06Q 20/40 (2012.01)

(52) U.S. Cl.
CPC ......... *G06Q 20/354* (2013.01); *G06Q 20/351* (2013.01); *G06Q 20/405* (2013.01)

(58) Field of Classification Search
CPC .. G06Q 20/354; G06Q 20/351; G06Q 20/405; G06Q 30/06
USPC .................................................. 705/35–41
See application file for complete search history.

(56) References Cited

U.S. PATENT DOCUMENTS

| 7,401,731 | B1* | 7/2008 | Pletz | G06Q 20/24 235/375 |
| 2003/0191711 | A1* | 10/2003 | Jamison | G06Q 20/04 705/40 |
| 2004/0128243 | A1* | 7/2004 | Kavanagh | G06Q 20/04 705/39 |
| 2007/0187492 | A1 | 8/2007 | Graves et al. | |
| 2007/0260547 | A1* | 11/2007 | Little | G06Q 20/12 705/52 |
| 2009/0319425 | A1* | 12/2009 | Tumminaro | G06Q 20/108 705/42 |

(Continued)

FOREIGN PATENT DOCUMENTS

WO WO2012/0162351 11/2012
WO WO-2014018442 A1 * 1/2014 ........... G06Q 20/405

OTHER PUBLICATIONS

Laurinaitis et al: "Alternative Payment Systems: Lithuanian Outlook", Mykolas Romeris University, Vilnius, Lithuania (Year: 2008).*

*Primary Examiner* — Edward J Baird
(74) *Attorney, Agent, or Firm* — Harness, Dickey & Pierce, PLC (57) ABSTRACT

A system and method of activating a payment card for use by a user are provided, wherein a processor associated with a network node is operated to: receive an indication of an identity of the payment card; associate the payment card identity with a first payment rule; receive registration information pertaining to the user; and responsive to determining that the registration information meets a predefined criterion, operating the processor to associate the payment card identity with a second payment rule different to the first payment rule.

8 Claims, 3 Drawing Sheets

(56) References Cited

U.S. PATENT DOCUMENTS

| | | | |
|---|---|---|---|
| 2011/0166914 A1* | 7/2011 | Dixon | G06Q 20/045 705/13 |
| 2011/0184866 A1* | 7/2011 | Shakkarwar | G06Q 20/10 705/44 |
| 2012/0095912 A1* | 4/2012 | James | G06Q 20/102 705/40 |
| 2014/0040125 A1 | 2/2014 | Kunz et al. | |
| 2014/0188723 A1* | 7/2014 | Pacher | G06Q 20/401 705/43 |

* cited by examiner

Figure 1

METHODS AND SYSTEMS FOR PROVIDING PAYMENT CARDS

CROSS-REFERENCE TO RELATED APPLICATION

This application claims the benefit of and priority to Great Britain Application No. 1409975.8 filed Jun. 5, 2014. The entire disclosure of the above application is incorporated herein by reference.

FIELD

The present disclosure generally relates to payment card systems. More particularly, it relates to methods and systems for providing payment cards for carrying out financial transactions.

BACKGROUND

This section provides background information related to the present disclosure which is not necessarily prior art.

There are multiple different types of payment cards available on the market. In some cases, a payment card may serve a specific purpose. For example, a payment card may be configured to enable a customer to make payments and/or withdraw cash in one or more foreign currencies. Additionally or alternatively, a payment card may be a Virtual Credit Card enabling a user to purchase items without exposing the user to the possibilities of credit card fraud. For example, the number of payments and/or the amount for which payments can be made using a Virtual Credit Card may be limited.

The increased security and cost efficiency resulting from the use of these types of payment cards has resulted in a rapid increase in demand. Accordingly, it would be desirable to distribute the cards in a wide range of retail outlets. However, financial products, such as payment cards, are governed by a strict set of regulations and, accordingly, information about the users of these products. The need to provide this information can make it impractical and inefficient to distribute products, such as payment cards, anywhere other than specialised outlets. Furthermore, in many cases, when purchased by a user, the payment card must comprise (or have access to) up-to-date information, for example, foreign exchange rates which may not be available to many retail outlets.

An improved method for providing payment cards would therefore be desirable.

SUMMARY

This section provides a general summary of the disclosure, and is not a comprehensive disclosure of its full scope or all of its features. Aspects and embodiments of the disclosure are also set out in the accompanying claims.

According to an aspect of the present disclosure, there is provided a computer-implemented method of activating a payment card for use by a user, the method being performed by a network node and comprising operating a processor associated with the network node to: receive an indication of an identity of the payment card; associate the payment card identity with a first payment rule; receive registration information pertaining to the user; and responsive to determining that the registration information meets a predefined criterion, operating the processor to associate the payment card identity with a second payment rule different to the first payment rule.

In some embodiments, prior to receiving the registration information pertaining to the user, the processor is operated to: receive a first payment request comprising an indication of the payment card identity; and authorize the first payment request in accordance with the first payment rule.

Subsequent to associating the payment card identity with the second payment rule, the processor may be operated to: receive a second payment request comprising an indication of the payment card identity; and authorize the second payment request in accordance with the second payment rule.

The first payment request may be initiated using the same payment card as is used to initiate the second payment request.

The indication of the payment card identity may be received from a point of sale terminal.

The registration information is received via a user interface.

The first payment rule may define a first maximum transaction value that can be effected using the payment card. The second payment rule may define a second maximum transaction value that can be effected using the payment card, wherein the second maximum value is greater than the first maximum value.

In some embodiments, the payment card is associated with a pre-payment account and wherein the first payment rule defines a first maximum amount of money that can be assigned to the pre-payment account. The second payment rule may define a second maximum amount of money that can be assigned to the pre-payment account, wherein the second maximum amount of money is greater than the first maximum amount of money.

The first payment rule may, for example, define a first currency in which transactions can be effected using the payment card. The second payment rule may then define a plurality of currencies in which transactions can be effected using the payment card. One or more of the currencies may be a virtual currency.

In some embodiments, the second payment rule defines at least one terminal at which the payment card can be used, wherein the payment card cannot be used at the at least one terminal in accordance with the first payment rule.

In some embodiments, the second payment rule defines at least one geographical area in which the payment card can be used, wherein the payment card cannot be used in the at least one geographical location in accordance with the first payment rule.

The identity of the payment card may comprise at least part of one or more of: a card number; a credit card verification number; and a serial number associated with the payment card.

The payment card may be configured for distribution on a J-hook shelf.

The predefined criterion may comprise a criterion specified by regulatory authorities.

The registration information may comprise information pertaining to a user of the payment card.

The information pertaining to the user may comprise an indication of an identity of the user, in which case the method further may comprise operating the processor to: associate the payment card identity with the identity of the user.

In some embodiments, determining that the registration information meets a predefined criterion comprises operating the processor to: transmit at least a subset of the received information to a further network element; and receive, from the further network element, an indication of whether the registration information meets the predefined criterion.

According to an aspect of the disclosure, there is provided a computer-readable medium comprising non-transitory instructions which, when executed, cause a processor to carry out any of the above-described methods.

According to an aspect of the disclosure, there is provided a network node comprising a processor configured to: receive an indication of an identity of the payment card; associate the payment card identity with a first payment rule; receive registration information pertaining to the user; and responsive to determining that the registration information meets a predefined criterion, operating the processor to associate the payment card identity with a second payment rule different to the first payment rule.

The processor may be configured such that prior to receiving the registration information pertaining to the user, the processor is operated to: receive a first payment request comprising an indication of the payment card identity; and authorize the first payment request in accordance with the first payment rule.

The processor may be configured such that subsequent to associating the payment card identity with the second payment rule, the processor is operated to: receive a second payment request comprising an indication of the payment card identity; and authorize the second payment request in accordance with the second payment rule.

The processor may be configured to receive the indication of the payment card identity from a point of sale terminal.

The processor may be configured to receive the registration information via a user interface.

The information pertaining to the user may comprise an indication of an identity of the user and in which case the processor may be configured to: associate the payment card identity with the identity of the user.

Determining that the registration information meets a predefined criterion may comprise operating the processor to: transmit at least a subset of the received information to a further network element; and receive, from the further network element, an indication of whether the registration information meets the predefined criterion.

According to an aspect of the disclosure, there is provided a system comprising: a network node as describe above; and a point of sale terminal, wherein the network node and the point of sale terminal are configured to communicate over a network.

In some embodiments, the payment card may be configured for distribution on a J-hook in a merchant store. For example, the payment card may be configured for distribution on a J-hook beside a point of sale in a merchant store.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
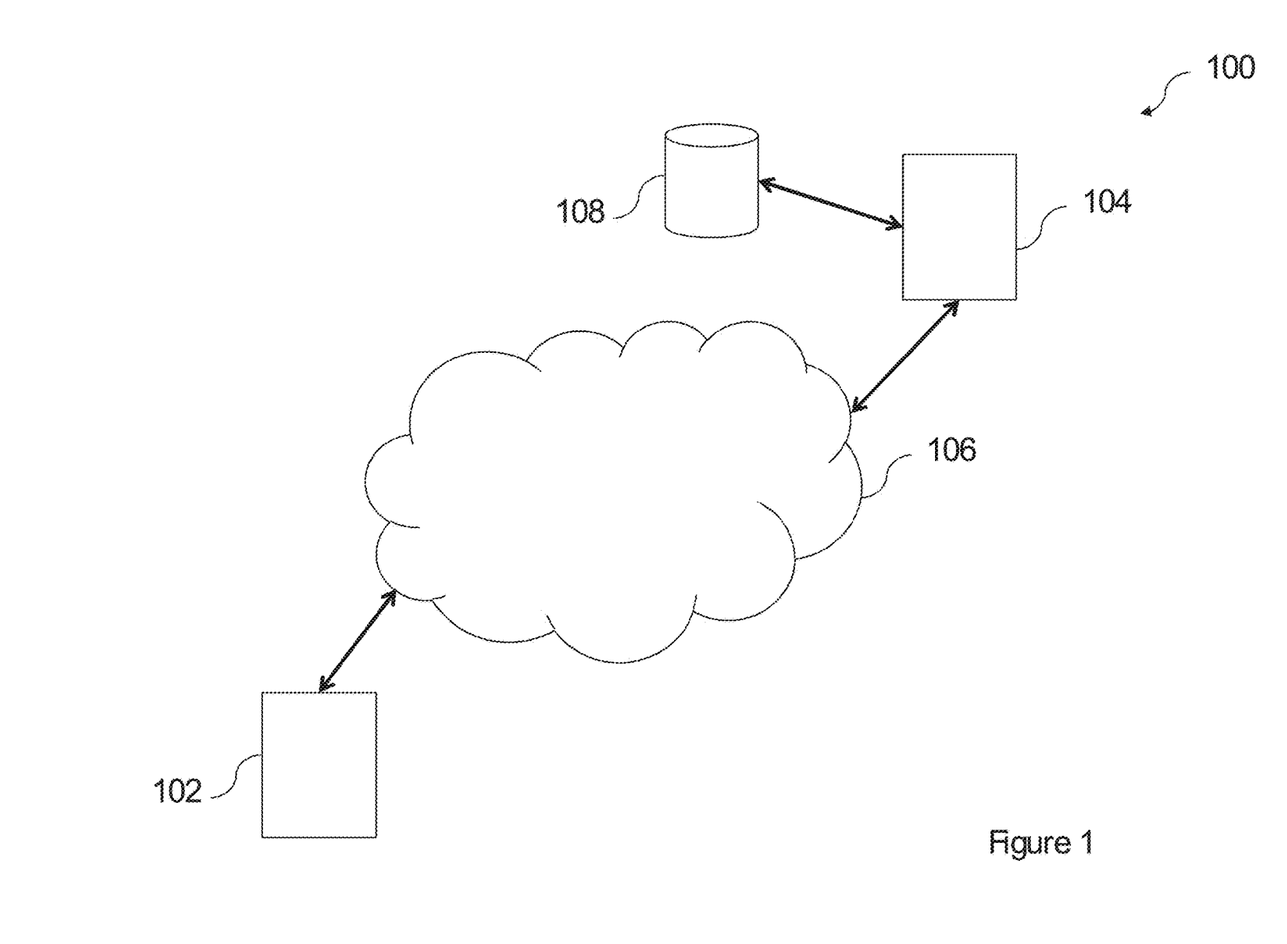
FIG. 1 is a diagram of a payment card system according to an embodiment of the present disclosure.

Referring to the drawings and, in particular to FIG. 1, an exemplary payment system 100 for processing payment requests is shown.

The system 100 comprises at least one merchant terminal 102 capable of, or adapted to, transmit a request to a network node 104 over a network 106. Accordingly, it will be appreciated that the merchant terminal 102 itself comprises a network node and is differentiated from the network node 104 in the following for ease of explanation only.

The at least one merchant terminal 102 may comprise, or be comprised within, a physical terminal. For example, the at least one merchant terminal 102 may comprise one or more of: a portable computing device (e.g. a laptop computer, a smartphone, a tablet computer etc.); a desktop computer; a Point Of Sale (POS) or merchant terminal, for example, a terminal located at a physical point of sale such as a shop or restaurant. Alternatively, the merchant terminal 102 may be a virtual terminal associated with a virtual Point Of Sale, e.g. a POS at which online purchases or payments are made. In some embodiments, the merchant terminal 102 may be an application running on a device, such as a portable telephone or computer (e.g. a 'smartphone' or tablet computer).

The network node 104 may comprise, or be comprised within, any suitable device. For example, the network node 104 may comprise, or be comprised within, a remote server. Additionally or alternatively, the network node 104 may be comprised within a base station. In what follows, the network node 104 will be referred to as a single node within the system 100. However, it will be appreciated that the network node may comprise multiple individual nodes at which the request is processed and/or re-transmitted.

Similarly, in what follows, the method steps are described as being performed by the network node 104. However, it will be appreciated that these steps may be performed by other elements of the system 100, or by one or more processors comprised within, or operated by, the network node 104 and/or other elements of the system 100. The network node 104 may be configured to communicate with one or more respective databases 108, for example, via a wired or wireless connection. For example, the network node 104 may write data to the one or more databases 108. Additionally or alternatively, the network node 104 may retrieve data stored in, or accessible to, the database 108.

The network node 104 may be an 'acquirer network node', for example, a POS or other such device associated with (linked to, operated on behalf of, comprised within a system of, etc.) a financial institution that processes (or facilitates) card payments made to a merchant or provides any other financial services. Additionally or alternatively, the network node 104 may be one or more of a network node associated with (linked to, operated on behalf of, comprised within a system of, etc.) a card issuer (or provider); and/or a card payment network node associated with a third party operating as, or in association with, a payment provider 110.

The merchant terminal 102 may communicate with the network node 104 using any suitable means. For example, the merchant terminal 102 and the network node 104 may communicate using one or more of Bluetooth™; Near-Field Communication (NFC); Infra-Red (IR) Communication; Magnetic Induction, etc.

In an exemplary embodiment, the network 106 may comprise any network across which communications can be transmitted and received. For example, the network 106 may comprise a wired or wireless network. The network 106 may, for example, comprise one or more of: the internet; a local area network; a radio network such as a mobile or cellular network; a mobile data network or any other suitable type of network. In one embodiment, the merchant terminal 102 communicates over the internet with a the network node 104 operating on 'a cloud'.

Figure 2:
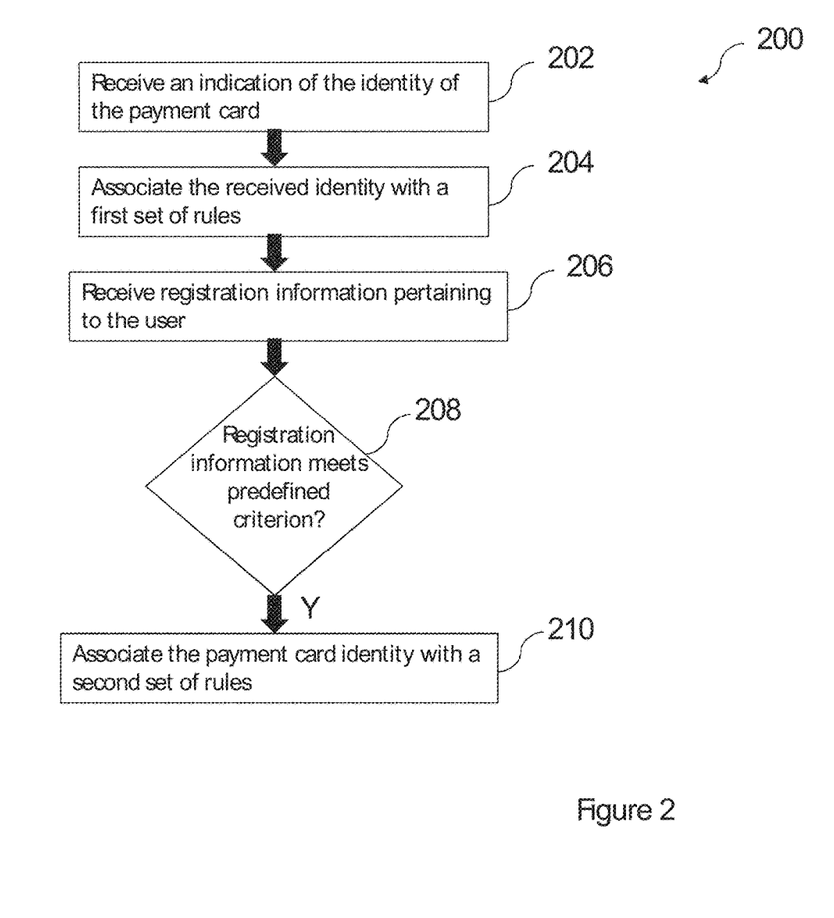
FIG. 2 is a flow diagram depicting an exemplary method of activating a payment card according to an embodiment of the disclosure.

FIG. 2 depicts an exemplary method 200 of activating or initializing a payment card for use by a user (or cardholder).

The payment card may be configured for distribution in one or more merchant stores other than a financial institution. For example, the payment card may be configured for distribution in a 'J-hook' environment or may be presented for purchase in any other suitable manner in a retail outlet, such as a grocery or clothing store.

The payment card is associated with, or comprises, a card number which may be referred to as a Primary Account Number (PAN) together with other card details, for example, a card expiry date, a card verification code (CVC) number, etc. These details may, for example, be printed on the payment card.

The payment card may be operable as any one or more of a credit card; a debit card; a card for making payments in one or more 'foreign' currencies (i.e. currencies other than the currency of the country in which the card was purchased); or any other card configured to make payments or effect financial transactions. In an exemplary embodiment, the payment card is a debit card configured to effect payments from an associated account.

At block 202, the network node 104 receives an indication of the payment card identity when a user purchases the payment card. The network node may receive the indication of the payment card identity in any suitable manner. For example, the POS may provide an indication of the payment card identity to the network node 104. Additionally or alternatively, the user may provide the indication of the payment card identity to the network node 104 via any suitable user interface. For example, the user may provide the payment card identity via one or more of an online interface; a telephone interface; or any other suitable registration process.

The indication of the payment card identity may, for example, comprise at least a part of any one or more of the PAN; the CVC number; an identifier associated with (or printed on) the payment card and/or the packaging of the payment card; and any other suitable indicator of the identity of the payment card. In an exemplary embodiment, the indication of the payment card identity is a unique code or number, for example, a serial number, associated with the physical payment card.

In some embodiments, at block 202, the network node 104 may also receive initial information pertaining to the payment card user. For example, the network node 104 may receive an indication of one or more of the user's name; address; date of birth; telephone number; email address or any other information pertaining the user.

At block 204, the network node 104 associates the received payment card identity with a first set of rules. This association may be performed in any suitable manner. For example, the network node 104 may store the first set of rules in the database 108 in association with an indication of the identity of the payment card. The stored indication of the payment card identity may comprise the indication received at block 202. Additionally or alternatively, the stored indication of the payment card identity may be any other suitable indication generated in accordance with the received identity.

The first set of rules comprises one or more rules defining the manner in which the payment card may be used. In some embodiments, the first set of rules defines any one or more of: a geographical location within which the payment card may be used; a type of terminal at which the payment card may be used (e.g. a POS, an ATM, or any other suitable terminal); a type of transaction that can be effected using the payment card; a maximum amount that can be paid using the card (e.g. a daily and/or transaction limit'); a currency in which payments can be made using the card; a maximum amount of money that may be held in an account associated with the card; a maximum amount of 'credit' that may be used when effecting payments using the payment card; and any other suitable rule or regulation regarding the manner in which the card may be used.

At block 206, the network node 104 receives data comprising registration information pertaining to the user. In an exemplary embodiment, the registration information may comprise one or more forms of nationally or internationally recognized identification documents such as a passport, driving license, government identification card, etc. The registration information may be referred to as 'Know Your Customer' (KYC) information.

Additionally or alternatively, the registration information may comprise an indication of the user's address and/or 'proof' or evidence of the user's address. For example, the registration information may comprise one or more utility bills, bank statements, or any other documentation providing evidence that the user resides at an indicated address.

The registration information may additionally or alternatively comprise any other information relating to the user and/or the user's financial situation. For example, the registration information may comprise an indication of the user's social security number and/or an indication of one or more financial institutions or banks used by the user.

In some embodiments, the first set of rules is associated with a predefined period, for example, one or more of a number of days, weeks or months. In this case, the payment card may be used in accordance with the first set of rules for the predefined period. If the network node 104 does not receive registration information in association with the payment card identity before expiration of the predefined period, the network node 104 may dis-associate the payment card identity from the first set of rules (and/or associates the payment card identity with a further set of rules) such that the payment card can no longer be used to effect transactions, i.e., the payment card is 'invalidated'. Accordingly, the user cannot continue to use the payment card indefinitely without providing registration information.

At block 208, the network node determines whether the received registration information meets a predefined criterion. The predefined criterion may be any suitable criterion defining a number or type of registration information required. For example, the predefined criterion may be a criterion defined by, or in association with, or on behalf of regulatory authorities. Additionally or alternatively, the predefined criterion may be a criterion defined by, or in association with, or on behalf of, one or more financial institutions, e.g. the provider of the payment card.

The network node 104 may determine whether the received registration meets the predefined criterion in any suitable manner. In some embodiments, the network node 104 applies image-processing techniques e.g. image and/or object recognition to determine whether the received documents meet the predefined criterion. For example, the network node 104 may apply image recognition means to identify that a document received at step 206 comprises a valid identification document and matches the identification information provided by the user.

Additionally or alternatively, at block 208, the network node 104 may output some or all of the received registration information for manual verification by an operator who may then input a positive or negative verification response via a user interface. Responsive to determining that the operator has input a negative verification response, the network node 104 determines that the registration information does not meet the predefined criterion, whilst responsive to determining that the operator has input a positive verification response, the network node 104 determines that the registration information does meet the predefined criterion.

In some embodiments, the network node 104 may transmit some or all of the received registration information to a further network element for verification. Responsive to receiving a positive response from the further network element, the network node 104 determines that the registration information does not meet the predefined criterion, whilst responsive to receiving a positive response from the further network element, the network node 104 determines that the registration information does meet the predefined criterion.

If the network node 104 determines that the registration information meets the predefined criterion, at block 210, the network node 104 associates the payment card identity with a second set of rules comprising one or more rules defining the manner in which the payment card may be used. The second set of rules comprises at least one rule that is not comprised within the first set of rules. For example, the second set of rules may comprise at least one rule defining any one or more of: a geographical location within which the payment card may be used, wherein the payment card could not be used in the location in accordance with the first set of rules; a type of terminal at which the payment card may be used (e.g. a POS, an ATM, or any other suitable terminal), wherein the payment card could not be used at this type of terminal in accordance with the first set of rules; a type of transaction that can be effected using the payment card, wherein this type of transaction is not permitted in accordance with the first set of rules; a maximum amount that can be paid using the card (e.g. a daily and/or transaction 'limit'), wherein the maximum is greater than a maximum amount that could be paid in accordance with the first set of rules; a currency in which payments can be made using the card, wherein the payment card could not be used to make payments in this currency in accordance with the first set of rules; a maximum amount of money that may be held in an account associated with the payment card, wherein the maximum amount is greater than a maximum amount that may be held in accordance with the first set of rules; a maximum amount of 'credit' than may be used when effecting payments using the payment card, wherein this maximum credit amount is greater than a maximum credit amount permitted in accordance with the first set of rules; and any other suitable rule or regulation regarding the manner in which the card may be used. In some embodiments, the second set of rules defines an exchange rate for conversion of amounts in an account associated with the payment card to one or more different currencies.

If, on the other hand, the network node 104 determines that the received registration information does not meet the predefined criterion the network node 104 may transmit (or output or communicate, etc.) a request to the user for further information. In an exemplary embodiment, the network node 104 identifies a means of contacting the user from the registration information received at block 208 and/or the information received at block 202. For example, the network node 104 may identify one or more of a telephone number, a postal address, an email address or any other suitable means of contacting the user.

In some embodiments, if the registration information provided at block 208 is determined not to meet the specified criterion, the user may continue to use the payment card in accordance with the first set of rules for a predetermined period of time. Additionally or alternatively, responsive to determining that the received registration does not meet the specified criterion, the network node 104 may dis-associate the payment card identity from the first set of rules (and/or associates the payment card identity with a further set of rules) such that the payment card can no longer be used to effect transactions, i.e. the payment card is 'invalidated'.

Accordingly, before a user provides required identification and/or registration information, the user may use the payment card in a limited number of scenarios or for making smaller payments, etc. However, on providing a required set of registration information, the user may use the same physical payment card and/or the same PAN in situations that were not previously permitted.

Figure 3:
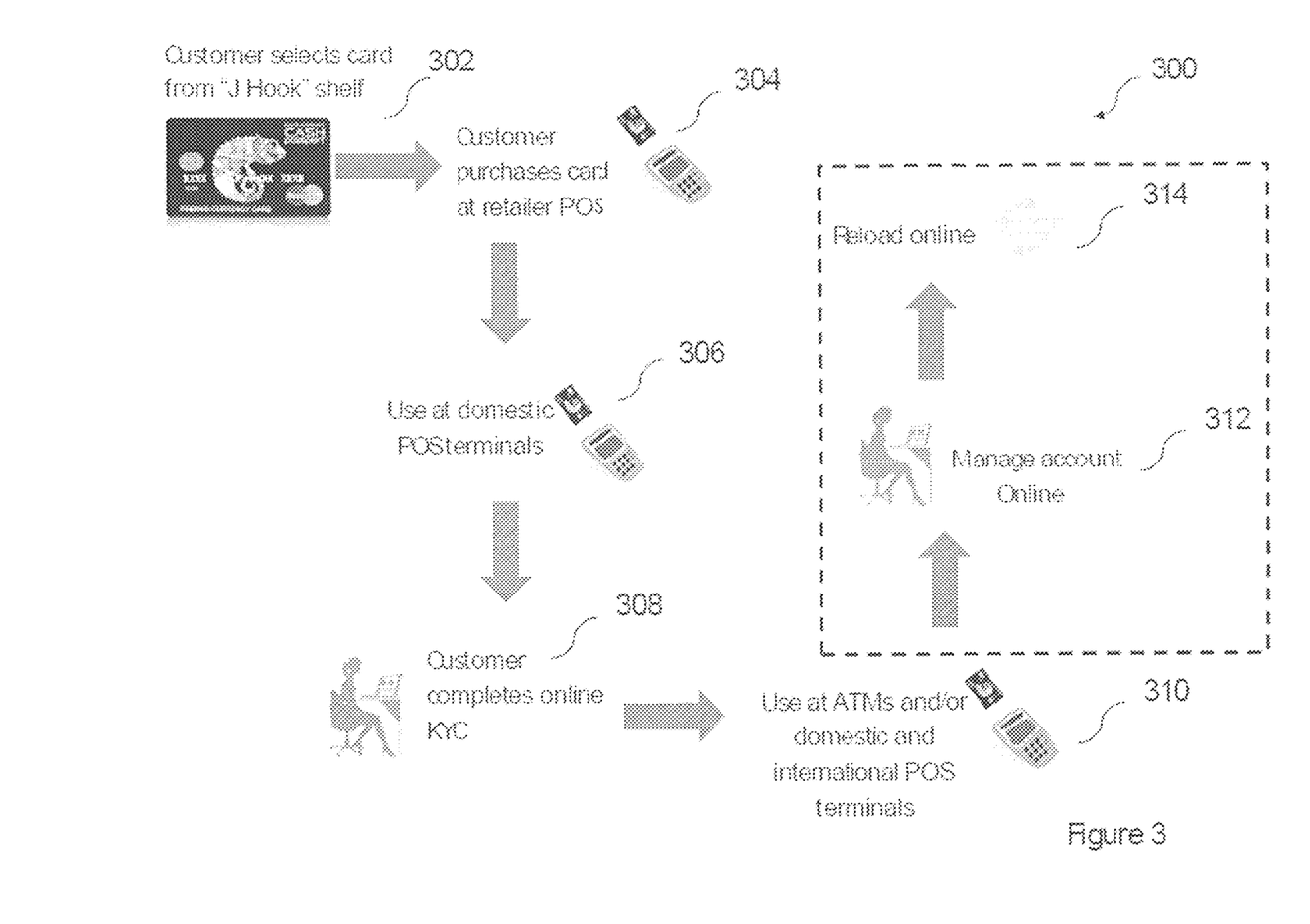
FIG. 3 depicts an exemplary method of operating the payment card system according to an embodiment of the disclosure.

FIG. 3 depicts an exemplary method 300 of operating the payment card system 100 according to an embodiment of the present disclosure.

At block 302 a customer selects the payment card from a 'J-hook' shelf of a retailer. The retailer may be a supermarket and the payment card may, for example, be located at a POS or in an aisle of the supermarket.

At block 304, the customer purchases the payment card at the retailer POS. On processing the transaction, the retailer POS transmits information comprising an indication of the identity to the payment card to the card issuer (or payment provider). For example, the retailer POS may transmit an indication of the identity of the physical card such as a serial number assigned to the card during manufacture. Additionally or alternatively, the indication of the payment card identity may be any other suitable identifier, for example, any of the identifiers discussed above in relation to block 202.

Responsive to receiving this information the card issuer 'activates' the card so that the customer can use the card to effect some payments and/or transactions. The payments and/or transactions permitted at this stage are a subset of the payments and/or transactions that may be performed using the card once further registration information (e.g. information required by regulatory authorities) is provided.

At block 306 the customer adds money to an account associated with the payment card ('tops up the card') and uses the payment card to effect one or more permitted transactions. For example, the customer may use the payment card to make payments at domestic POS terminals (which may be physical and/or virtual terminals).

At block 308, the customer provides registration information to the card issuer by completing an online Know Your Customer (KYC) process. As discussed above in relation to FIG. 2, the registration information may comprise information required by regulatory authorities in order to permit the customer to use the payment card to effect one or more specific transactions. Prior to the card issuer receiving the required registration information, the payment card may not be used to effect any such transactions. In the exemplary embodiment of FIG. 3, prior to the provision of the required registration information, the customer may not use the payment card at ATMs or POS terminals in countries other than the country in which the payment card was purchased.

At block 310, subsequent to the completion of the KYC process, the customer uses the same physical payment card as was purchased at block 304 to effect payments and/or transactions at one or more of: an Automated Teller Machines (ATM); a domestic POS terminal; and an international POS terminal (i.e. a POS terminal that is located in countries other than that in which the payment card was purchased). In this manner, the customer may continue to use the original card but may now effect both the transactions permitted prior to the provision of KYC information and transactions that were previously not permitted.

At block 312, the customer may optionally manage an account associated with the payment card online. For example, the user can check the account balance, transfer money into or out of the account or perform any other desirable tasks in relation to the account and/or the money in the account. For example, at block 314 the customer may 're-load' or 'top-up' the account, i.e. by transferring money from another account to the account associated with the payment card.

The present disclosure is not limited to the embodiment(s) described herein but can be amended or modified without departing from the scope of the present disclosure. Additionally, it will be appreciated that in embodiments of the disclosure some of the above-described steps may be omitted and/or performed in an order other than that described.

It should be appreciated that the functions and/or steps described herein, in some embodiments, may be described in computer executable instructions stored on a computer readable media (e.g., in a physical, tangible memory, etc.), and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

With that said, exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed. As used herein, the term "and/or" includes any and all combinations of one or more of the associated listed items.

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method of activating a payment card for use by a user, the method being performed by a network node and comprising:

receiving, by a processor associated with the network node, an indication of an identity of the payment card;

based on the received indication, associating, by the processor, the identity of the payment card with a first payment rule, the first payment rule defining a condition of use of the payment card prior to registration of the payment card, the condition of use defined by the first payment rule including a geographic condition defining a geographic location within which the payment card is usable and a terminal type condition defining a type of terminal at which the payment card is usable, wherein the payment card is usable in a transaction prior to registration of the payment card when the transaction with the payment card conforms to the condition of use defined by the first payment rule;

after associating the identity of the payment card with the first payment rule, receiving, by the processor, registration information pertaining to the user, wherein the registration information pertaining to the user includes at least one of an identity attribute of the user and a financial attribute of the user; and responsive to a determination that the registration information meets a predefined criterion, associating, by the processor, the identity of the payment card with a second payment rule different from the first payment rule, the second payment rule defining a condition of use of the payment card after the registration of the payment card, wherein the condition of use of the payment card defined by the second payment rule is less restrictive than the condition of use defined by the first payment rule, whereby the condition of use defined by the second payment rule includes an increase in the geographic location defined by the geographic condition defined by the first payment rule and an additional one or more types of terminals at which the payment card is usable to the type of terminal defined by the terminal type condition defined by the first payment rule, wherein the payment card is not usable at the additional one or more types of terminals in accordance with the first payment rule.

2. The method of claim 1, further comprising, prior to receiving the registration information pertaining to the user:
   receiving, by the processor, a first payment request comprising a first indication of the identity of the payment card; and
   in response to the first payment request, authorizing, by the processor, the first payment request in accordance with the first payment rule.

3. The method of claim 2, further comprising, subsequent to associating the identity of the payment card with the second payment rule:
   receiving, by the processor, a second payment request comprising a second indication of the identity of the payment card; and
   in response to the second payment request, authorizing, by the processor, the second payment request in accordance with the second payment rule.

4. The method of claim 3, wherein the first payment request is initiated using the same payment card as is used to initiate the second payment request.

5. The method of claim 1, wherein the indication of the identity of the payment card is received from a point of sale terminal; or
   wherein the registration information is received via a user interface.

6. The method of claim 1, wherein the condition of use defined by the first payment rule further includes a first maximum transaction amount condition that can be effected using the payment card, and wherein the condition of use defined by the second payment rule further includes a second maximum transaction amount condition that can be effected using the payment card, wherein a value of the second maximum amount condition is greater than a value of the first maximum amount condition.

7. The method of claim 1, further comprising determining that the registration information meets the predefined criterion, including:
   transmitting, by the processor, at least a subset of the received registration information to a further network element; and
   receiving, by the processor, from the further network element, an indication that the registration information meets the predefined criterion; and
   wherein associating the identity of the payment card with the second payment rule includes associating the identity of the payment card with the second payment rule responsive to the indication.

8. The method of claim 1, wherein the condition of use defined by the first payment rule further includes a first currency condition in which transactions can be effected in a first currency using the payment card, and wherein the condition of use defined by the second payment rule further includes a plurality of currency conditions in which transactions can be effected in a plurality of currencies using the payment card.

* * * * *